United States Patent

[11] 3,597,106

| [72] | Inventor | Bernard Joseph Anderson |
| | | Danvers, Mass. |
| [21] | Appl. No. | 869,003 |
| [22] | Filed | Oct. 24, 1969 |
| [45] | Patented | Aug. 3, 1971 |
| [73] | Assignee | General Electric Company |

[54] COMBINATION COMPRESSOR CASING-AIR MANIFOLD STRUCTURE
6 Claims, 4 Drawing Figs.

| [52] | U.S. Cl.................................................. | 415/144, |
| | | 415/219 |
| [51] | Int. Cl.......................................................F01b 25/00, |
| | | F04b 25/24 |
| [50] | Field of Search........................................... | 415/11, |
| | 115, 144, 145, 146, 147, 148, 149, 219 |

[56] References Cited
UNITED STATES PATENTS

| 2,520,697 | 8/1950 | Smith............................ | 415/144 |
| 2,693,904 | 11/1954 | Boyd............................. | 415/144 |
| 2,702,665 | 2/1955 | Ledwith........................ | 415/145 |
| 2,738,921 | 3/1956 | Hausmann..................... | 415/115 |
| 2,958,456 | 11/1960 | Forshaw........................ | 415/11 |
| 3,398,881 | 8/1968 | Greenberg et al............. | 415/144 |

Primary Examiner—Henry F. Raduazo
Attorney—Loren W. Peters, Derek P. Lawrence, Frank L. Neuhauser, Oscar B. Waddell and Joseph B. Forman ABSTRACT: A gas turbine engine compressor casing structure is disclosed which provides a full annular bleed orifice for bleeding compressor stage air to a plenum chamber surrounding the aft stages of the compressor and thence to a full annular chamber adjacent the engine's combustion section. The compressor casing is constructed with an aft section which has an expanded diameter and is connected with the adjacent section of the engine structure by means of a bolted flange. A separate inner compressor casing is provided to support the latter stage stator vanes and telescopes within the outer casing. A lip is provided the forward end of the inner casing so that when it is assembled with the primary compressor casing, the lip forms in cooperation with the adjacent inner wall of the forward section of the primary casing an annular bleed orifice in the compressor inner wall. The full annular chamber is defined by an outer wall, an inner wall, and an end wall, and is in communication with the space between the aft section of the primary compressor casing and the inner compressor casing.

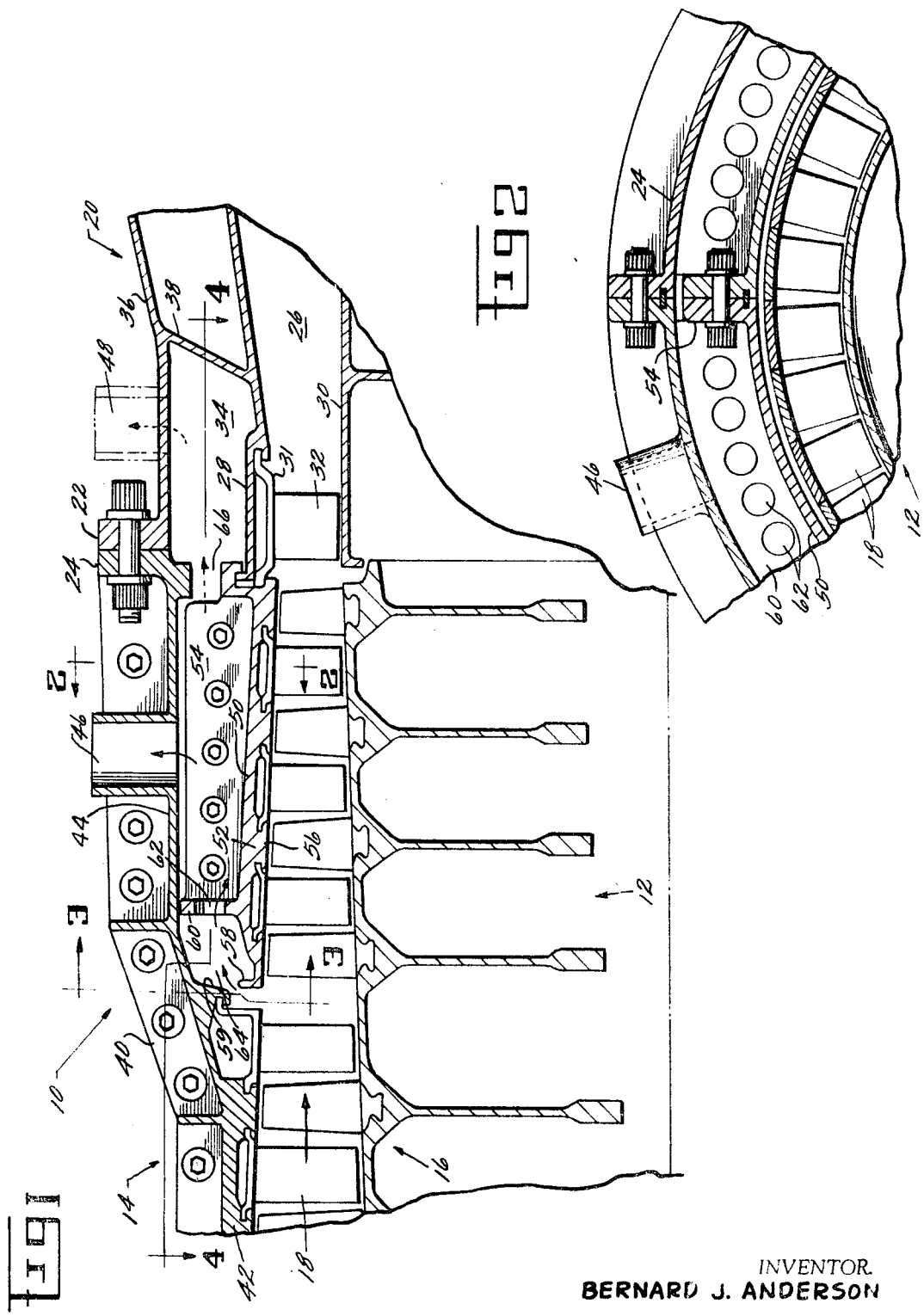

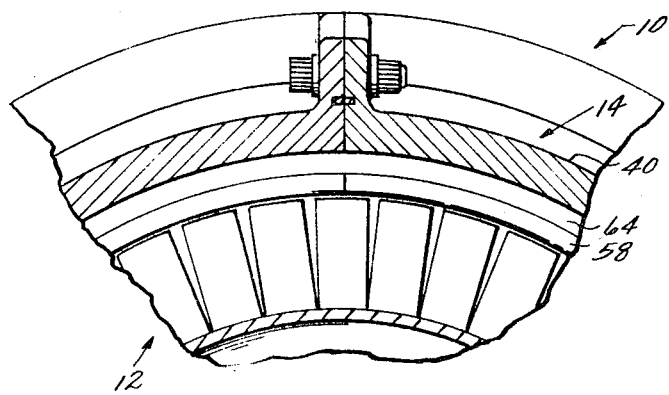
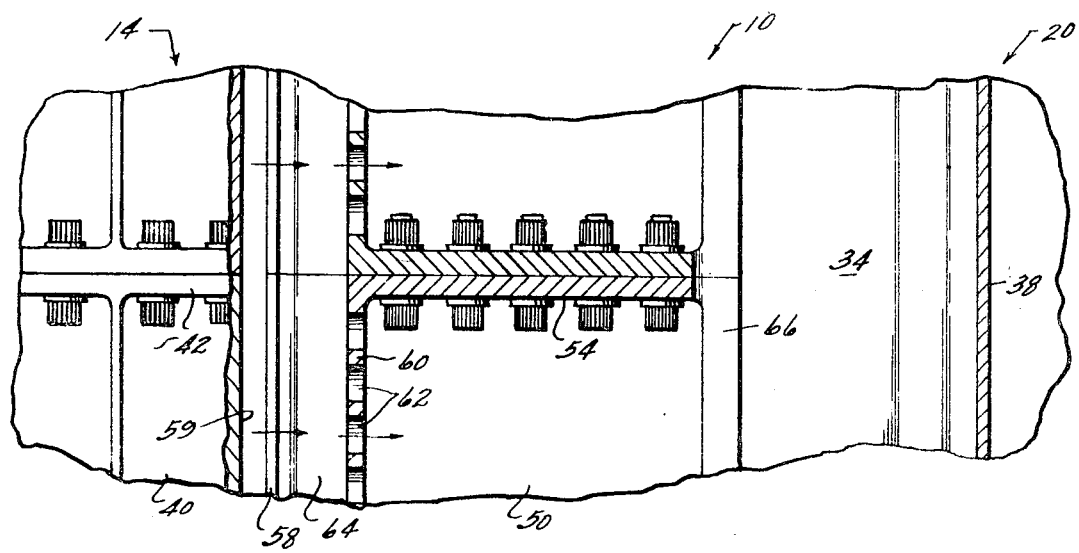

COMBINATION COMPRESSOR CASING-AIR MANIFOLD STRUCTURE

BACKGROUND OF THE INVENTION

This invention relates to gas turbine engine casing structures and, more particularly, to such structures which are adapted for bleeding interstage air from the compressor.

It is often desirable that an aircraft gas turbine engine include a compressor structure which permits bleeding of high-pressure air from between two of the latter stages of the compressor to provide pressurized air for operation of airframe accessories, engine accessories, or engine or aircraft deicing systems. Preferably, this interstage bleeding is accomplished by means which provide minimal interference with the normal airflow patterns in the compressor, and the structure provided for this purpose should offer minimal engine frontal area penalties and assembly complexity.

Many gas turbine engine compressor structures comprise at least two generally cylindrical segments which are joined together by bolted flanges. To provide an interstage bleed air plenum surrounding the compressor casing so as to allow a peripherally uniform flow of air from between compressor stages, means must be included in the plenum structure to bridge the compressor casing joints. Prior practice has been to provide special external ducting to bridge the compressor casing split line flange where it interrupts a conventional bleed manifold. Such a structure is, however, desirably subject to improvement to avoid the need for external bridging in the interest of simplifying engine assembly and maintaining a uniformly small frontal profile. To this end, in accordance with the objects of the invention, applicant has invented a novel structure in which interstage bleed air manifolding is all maintained internally of the compressor and engine outer casing, and which is further adapted to provide a full annular bleed orifice between compressor stages so that interstage airflow from the compressor will be uniform around its periphery.

BRIEF SUMMARY OF THE INVENTION

Briefly stated, the invention is an engine casing structure which comprises a primary compressor casing having a forward section immediately surrounding the compressor rotor and a concentric rear section whose wall is radially spaced from the rotor, and an inner compressor casing telescoped within the rear portion of the primary compressor casing and maintained with its forward edge spaced from the adjacent inner surface of the primary compressor casing to form a full annular bleed orifice in communication with the plenum or manifold defined by the rear portion of the primary compressor casing and the inner compressor casing.

BRIEF DESCRIPTION OF THE DRAWINGS

While the specification concludes with claims particularly pointing out and distinctly claiming the invention, it is believed that it will be more readily understood from the description below and reference to the accompanying drawings in which:

FIG. 1 is a partially fragmented section view of the aft end of a gas turbine engine compressor section;

FIG. 2 is a partially fragmented section view taken along the line 2-2 of FIG. 1;

FIG. 3 is a partially fragmented section view taken along the line 3-3 of FIG. 1; and FIG. 4 is a partially fragmented section view taken along the line 4-4 of FIG. 1.

DESCRIPTION OF THE PREFERRED EMBODIMENT

Referring to FIG. 1, a compressor 10 is shown which comprises a rotor 12 and a casing structure 14, the casing structure including stator stages 16 which carry a plurality of individual stator blades 18. A manifold-diffuser section 20 is secured to compressor 10 by a pair of bolted mating flanges 22, 24. A diffuser passageway 26 in manifold-diffuser section 20 is defined by a casing inner wall 28, a diffuser wall 30, and supporting member 31 which supports a plurality of outlet guide vanes 32 in the passageway 26. Section 20 further includes an annulus 34 defined by the manifold-diffuser section 20 outer shell 36, and end wall 38, and the casing inner wall 28.

The compressor casing structure 14 comprises a primary casing 40 which includes a forward section 42 immediately surrounding rotor 16, a concentric rear section 44 having a diameter which is larger than that of forward section 42, and a discharge port 46, from which compressor bleed air can be supplied for engine inlet anti-icing and/or for airframe anti-icing, or other airframe purposes. An alternative location for an air discharge port is the port 48 shown in broken lines which is adapted to bleed air from annulus 34.

An inner compressor casing 50 is secured to the manifold-diffuser section 20 casing inner wall 28 and extends into the rear section 44 of primary casing 40, the forward end of casing 50 being spaced from forward section 42. Inner casing 50 comprises a pair of semiannular walls 52 (see FIG. 2) joined at the inner casing split line by mating flanges 54, stator support members 56 supporting a plurality of stator stages 16, and a radially extending forward lip 58 which is maintained in spaced relation with an inner surface 59 on forward section 42 of primary casing 40. Additionally, a rib 60 containing a plurality of openings 62 (see also FIG. 2) is provided to divide the space between inner casing 50 and the wall of rear section 44 into two compartments, a forward compartment 64 defined by lip 58 and a rib 60, and a rear compartment 66.

Referring to FIGS. 1 and 3, the combination of lip 58 and inner surface 59 provide an uninterrupted annular orifice for bleeding interstage air from the interior of compressor 10, which bleed air is then directed into the plenum described as forward compartment 64. From compartment 64, the bleed air then passes through openings 62 into air compartment 54 and thence out discharge port 46 to an engine or airframe load. As can be seen in FIG. 2, openings 62 form a plurality of orifices which provide communication between rear compartment 66 and forward compartment 64 and serve in combination with rear compartment 66 to attenuate flow disturbances caused by variations in the load attached to discharge port 46 and to minimize the effect of the load disturbances on the discharge side of the annular orifice defined by lip 58 and surface 59, thus minimizing the effect of load disturbances on the performance of compressor 10. The provision of the full annular orifice described further minimizes disturbances to the flow pattern in the compressor in that air is bled from the full circumference of the compressor instead of being bled from discrete locations placed around the periphery thereof.

Referring now to FIG. 4, the purpose of annulus 34 will be explained. Ordinarily, it is desirable that a single discharge port such as port 46 be provided to take air form the compressor casing. As can be seen by reference to FIGS. 1 and 2, flanges 54 on inner casing 50 would, absent some means for bridging these flanges, effectively block free circulation peripherally of inner casing 50 to the rear compartment 66 to discharge port 46. A common prior art means for bridging such a flange comprises a section of piping secured to the upper and lower halves of the appropriate casing and assembled to the casing halves after their assembly together. Such a means can provide assembly and disassembly complexity and further may add to the engine frontal area. The structure described herein obviates these difficulties by providing in annulus 34 an alternative bridging means. As shown by FIG. 4, air will flow from one-half of the rear compartment 66 into annulus 34 and thence into the other half of compartment 66 to the outlet port 46, thus bridging the obstruction necessarily caused by flanges 54. If the alternative discharge port 48 is used, air will proceed from each of the halves of rear compartment 66 into annulus 34 and thence through alternative discharge port 48.

Having thus described one embodiment of the invention, although not exhaustive of all the possible equivalents, the applicant desires to secure by letters patent the invention particularly pointed out and distinctly claimed in the claims below.

I claim:

1. In a gas turbine engine comprising a compressor section, a combustor section, and a turbine section downstream of the combustor section, a combination compressor casing-bleed air plenum structure which comprises:

a primary compressor casing which includes a forward section immediately surrounding the compressor rotor and adapted to support on its interior surface a plurality of stages of stator blades, and a concentric rearward section whose wall is radially spaced from said rotor;

an inner compressor casing immediately surrounding at least one aft stage of the compressor rotor and telescoped within the rearward portion of said primary compressor casing;

means supporting said inner compressor casing in the stated telescoped relationship so that its forward end is axially spaced from the forward section of said primary compressor casing, whereby the forward end of said inner compressor casing in cooperation with an interior surface of said primary compressor casing defines a peripheral orifice for bleeding high-pressure air from a compressor stage, and further wherein said inner compressor casing and the rearward portion of said primary compressor casing cooperate to from a bleed air manifold in the compressor section of said engine;

a peripheral rib near the forward end of said inner compressor casing and spaced therefrom, said rib radially extending to a position adjacent the interior of said rearward section and including a plurality of axially oriented passages therethrough, thereby dividing said bleed air manifold into two compartments, whereby said forward compartment acts as an accumulator to attenuate perturbations in the removal of air from said rear compartment, thereby minimizing flow disturbances in the compressor;

and means for extracting air from said plenum included in the rear compartment.

2. The structure recited in claim 1 wherein the forward end of said inner compressor casing includes a narrow lip which in cooperation with an adjacent interior surface of said primary compressor casing defines an uninterrupted peripheral interstage bleed orifice.

3. The structure recited in claim 2 wherein said lip is directed generally radially toward the said adjacent interior surface to define therewith an annular orifice.

4. The structure recited in claim 1 wherein said inner compressor casing comprises at least two cylindrical sectors, each of which includes axial bolting flanges radially extending from their exterior surfaces, said sectors being joined together at said flanges, and further wherein said structure includes means for providing airflow communication between the sectors of said bleed air manifold defined by the said flanges.

5. In a gas turbine engine comprising a compressor section, a combustor section downstream thereof, and a turbine section downstream of the combustor section, a combination casing —bleed air plenum structure which comprises:

a primary compressor casing which includes a forward section immediately surrounding the compressor rotor and adapted to support on its interior surface a plurality of stages of stator blades, and a concentric rearward section whose wall is radially spaced from said rotor, said rearward section including at its aft end a peripheral bolting flange normal to the axis thereof;

a second structural member which comprises an outer shell which includes at its forward end a peripheral flange secured to said first-mentioned flange, an inner wall concentric with said outer shell, and an end wall connecting said outer shell and said inner wall at a location removed from said latter mentioned flange, said inner wall extending from said end wall to a plane approximate that of said flanges, said outer shell, inner wall, and end wall defining a uninterrupted annulus in said second structural member; and an inner compressor casing supported by said inner wall and telescoped within the rearward portion of said primary compressor casing and maintained with its forward edge in spaced relation with the forward section of said primary compressor casing, said inner compressor casing comprising an annular wall member and means on the interior thereof for supporting at least one stage of stator blades;

said inner compressor casing and said inner wall cooperating to from one wall of an air plenum chamber and the rearward portion of said primary compressor casing cooperating with said outer shell to form an outer plenum wall concentric with said one wall;

said structure further including bleed means for the passage of air from the interior of said casing to said plenum, said bleed means comprising a peripheral lip extending radially from the forward end of said inner compressor casing to radially spaced relation with the interior surface of the rearward portion of said primary compressor casing, thereby defining an annular bleed orifice.

6. The structure recited in claim 5 wherein said inner compressor casing further includes a peripheral rib near its forward end and spaced therefrom, said rib radially extending to be adjacent the interior of said rearward section and including a plurality of axially oriented passages therethrough, thereby dividing said plenum into two compartments, the forward compartment defined by said peripheral lip and said rib and the rearward compartment defined by said rib and said end wall.

whereby said forward compartment acts as an accumulator to attenuate perturbations in the removal of air from said rear compartment, thereby minimizing flow disturbances in the compressor.